(12) United States Patent
Zehnder

(10) Patent No.: US 11,915,301 B2
(45) Date of Patent: Feb. 27, 2024

(54) PRODUCT ORDERING SYSTEM AND METHOD

(71) Applicant: Zirks, LLC, Rocky River, OH (US)

(72) Inventor: Kirk P. Zehnder, Rocky River, OH (US)

(*) Notice: Subject to any disclaimer, the term of this patent is extended or adjusted under 35 U.S.C. 154(b) by 0 days.

(21) Appl. No.: 16/856,375

(22) Filed: Apr. 23, 2020

(65) Prior Publication Data

US 2020/0342515 A1 Oct. 29, 2020

Related U.S. Application Data

(60) Provisional application No. 62/837,854, filed on Apr. 24, 2019.

(51) Int. Cl.

| | |
|---|---|
| *G06Q 30/06* | (2023.01) |
| *G06Q 10/08* | (2023.01) |
| *G06Q 30/0601* | (2023.01) |
| *G06Q 10/0833* | (2023.01) |
| *G06Q 10/087* | (2023.01) |
| *G06Q 30/0201* | (2023.01) |
| *G06Q 50/28* | (2012.01) |

(52) U.S. Cl.
CPC ....... *G06Q 30/0633* (2013.01); *G06Q 10/087* (2013.01); *G06Q 10/0833* (2013.01); *G06Q 30/0206* (2013.01); *G06Q 30/06* (2013.01); *G06Q 30/0601* (2013.01); *G06Q 30/0641* (2013.01); *G06Q 50/28* (2013.01)

(58) Field of Classification Search
None
See application file for complete search history.

(56) References Cited

U.S. PATENT DOCUMENTS

| | | | | |
|---|---|---|---|---|
| 5,491,782 A | * | 2/1996 | King | G06F 3/04847 715/833 |
| 5,884,056 A | * | 3/1999 | Steele | G06F 16/739 348/E7.071 |
| 7,136,830 B1 | * | 11/2006 | Kuelbs | G06Q 30/06 705/26.2 |
| 7,619,638 B2 | * | 11/2009 | Walker, Jr. | G06Q 30/0276 709/203 |
| 8,165,952 B2 | * | 4/2012 | Burrell | G06Q 40/06 382/209 |

(Continued)

FOREIGN PATENT DOCUMENTS

WO WO-2016208080 A1 * 12/2016 ............. G06Q 30/02

OTHER PUBLICATIONS

Anon., "Richway 'masters' its automated DC," Discount Store News 23: p. 3(2), Lebhar-Friedman, Inc., Aug. 6, 1984. (Year: 1984).*

(Continued)

*Primary Examiner* — Nicholas D Rosen
(74) *Attorney, Agent, or Firm* — Timothy A. Hodgkiss

(57) ABSTRACT

A product ordering system and method provides an online portal for a buyer to select a product for purchase, whereby the product being purchased is already en route and shipped to a destination by a seller. The online portal allows the buyer to select a quantity, purchase terms, payment type. Based on this information from the buyer, as well as in some cases, the remaining quantity of product and/or the remaining days the products have before their shipment is completed, a per unit price is computed.

8 Claims, 3 Drawing Sheets

(56) References Cited

U.S. PATENT DOCUMENTS

| | | | | |
|---|---|---|---|---|
| 8,521,620 B2* | 8/2013 | Livingston | | G06Q 10/0631 |
| | | | | 705/28 |
| 8,615,473 B2* | 12/2013 | Spiegel | | G06Q 10/0835 |
| | | | | 705/332 |
| 9,760,854 B1* | 9/2017 | Chowdhary | | G06Q 10/0838 |
| 9,922,356 B1* | 3/2018 | Garcia, III | | H04N 5/23206 |
| 10,453,042 B2* | 10/2019 | Amancherla | | G06Q 20/3821 |
| 11,468,457 B2* | 10/2022 | Dione | | G06Q 30/0202 |
| 2001/0032162 A1* | 10/2001 | Alsberg | | G06Q 40/00 |
| | | | | 705/37 |
| 2002/0010715 A1* | 1/2002 | Chinn | | G06F 16/957 |
| | | | | 715/236 |
| 2003/0144946 A1* | 7/2003 | Misawa | | G06Q 40/04 |
| | | | | 705/37 |
| 2004/0019552 A1* | 1/2004 | Tobin | | G06Q 40/04 |
| | | | | 705/37 |
| 2004/0085330 A1* | 5/2004 | Walker, Jr. | | G06Q 30/0276 |
| | | | | 345/630 |
| 2007/0203821 A1* | 8/2007 | DuFour | | G06Q 10/08 |
| | | | | 705/37 |
| 2007/0226122 A1* | 9/2007 | Burrell | | G06Q 40/025 |
| | | | | 705/37 |
| 2010/0076895 A1* | 3/2010 | Spencer | | G06Q 10/0637 |
| | | | | 705/7.36 |
| 2011/0047021 A1* | 2/2011 | Jamil | | G06Q 10/087 |
| | | | | 705/14.34 |
| 2012/0166241 A1* | 6/2012 | Livingston | | G06Q 10/0631 |
| | | | | 705/7.12 |
| 2012/0323645 A1* | 12/2012 | Spiegel | | G06Q 10/083 |
| | | | | 705/14.1 |
| 2013/0204732 A1* | 8/2013 | Moskos | | G06Q 30/08 |
| | | | | 705/26.3 |
| 2013/0254085 A1* | 9/2013 | Tanimoto | | G06Q 40/04 |
| | | | | 705/37 |
| 2014/0229327 A1* | 8/2014 | Khanna | | G06Q 30/0633 |
| | | | | 705/26.8 |
| 2016/0063769 A1* | 3/2016 | Nicolai | | G07B 17/00435 |
| | | | | 705/408 |
| 2017/0161701 A1* | 6/2017 | Amancherla | | G07F 17/3244 |
| 2018/0276695 A1* | 9/2018 | Dione | | G06N 20/10 |
| 2018/0322592 A1* | 11/2018 | Schiller | | H04M 15/85 |
| 2019/0102788 A1* | 4/2019 | Lewis | | G06Q 30/0206 |
| 2020/0051010 A1* | 2/2020 | Bhageria | | G06Q 10/0833 |

OTHER PUBLICATIONS

Anon., "Talk this way: shippers, third-party logistics providers and carriers transition to new forms of connectivity to cut costs and improve visibility," Commercial Carrier Journal, 163.3:78. Randall Publishing Co., Mar. 2006. (Year: 2006).*

* cited by examiner

PRODUCT ORDERING SYSTEM AND METHOD

CROSS-REFERENCE TO RELATED APPLICATION

This application claims the benefit of U.S. Provisional Patent Application No. 62/837,854 filed on Apr. 24, 2019, the contents of which are incorporated herein by reference.

TECHNICAL FIELD

The various embodiments disclosed herein relate to product ordering systems and methods thereof. In particular, the various embodiments disclosed herein relate to online systems and methods for ordering products. More particularly, the various embodiments disclosed herein relate to online systems and methods in which a buyer orders products while the products are in the process of being shipped by a seller from their origin.

BACKGROUND

Buyers in the U.S. have a need to purchase various products, such as industrial products or other commodities, which are produced in foreign countries. In order to purchase and acquire such products, these U.S. buyers must interact with various foreign entities, from importers, exporters, manufacturers, and distributors, which together form a long and complex supply chain. Given that these entities are based outside of the U.S., language barriers often arise, making it difficult for buyers to effectively communicate and negotiate purchase terms. In addition to language barriers, complicated import/export/tariff issues exist, which make it impossible for inexperienced buyers to anticipate which entities in the supply chain are offering favorable or unfavorable commercial terms. Furthermore, due to these particularities and the sheer number of entities that are part of the supply chain, U.S. buyers of products manufactured abroad tend to experience higher prices and longer lead times, which are not desirable.

Accordingly, there is a need for a system and method to order various products, including commodities, that enables buyers to quickly and easily purchase products while they are being shipped by a seller and are in transit to their destination, such as from a foreign country, as in the case of a U.S. buyer. In addition, there is a need for a product ordering system that enables customers to determine a price of a product based on one or more of: (1) the quantity of products ordered; (2) the terms of purchase; (3) the payment type; (4) the remaining product quantity; and/or (5) the time remaining in the transit time (or until arrival) of the product to its destination. Furthermore, there is a need for a product ordering system that is easy to use, allows shorter lead times and allows for increased cost savings over current product purchasing methods.

SUMMARY

It is one aspect of the various embodiments disclosed herein to provide a method of ordering a product including shipping a quantity of a product; offering, by a seller, the quantity of the product for sale after the initial quantity of the product has been shipped; and ordering, by a buyer, during shipment of the initial quantity of the product, at least a portion of the quantity of the product as an ordered quantity of the product.

It is another aspect of the various embodiments disclosed herein to provide a method of selling a product including shipping a quantity of a product; and while the quantity of the product is being shipped, performing one or more of: offering, by a seller, the quantity of the product for sale, ordering, by a buyer, at least a portion of the quantity of the product being shipped as an ordered quantity, or sending, to the seller, information from the buyer relating to a product request; or sending, to the seller, feedback information.

BRIEF DESCRIPTION OF THE DRAWINGS

These and other features and advantages of the various embodiments disclosed herein will become better understood with regard to the following description, accompanying drawings, and appended claims, wherein:

DETAILED DESCRIPTION

A product ordering system and method is configured so that a buyer, through an online portal, is able to view, select and order a portion, or all, of a quantity of products that are currently being shipped by a seller and are en route to their destination. That is, products offered for sale through the online portal have already been shipped by the seller from their origin destination, such as a foreign (e.g. China) shipping port for example, to a preselected destination (such as a U.S. shipping port for example), while they are ordered by a buyer. For example, the seller may ship products in a shipping container that includes a quantity of products, with this shipping container being carried aboard a cargo ship. In some cases, the products may be grouped together, such as in bulk, and offered for sale in smaller predetermined or individual quantities, such as in cases, pallets or as individual quantities for example. Thus, while the shipping container is in transit to its destination port, the system and method disclosed herein allows the seller to offer these products for sale to a buyer, who has the opportunity to purchase these products. Such a system for offering products for sale while they are actively in transit to a destination provides substantial cost savings to the buyer due to the reduction of the number of entities in the supply chain.

It should be appreciated that while the examples presented herein refer to shipping ports, such as origin and destination ports for example, to identify the end points of the route the products take when they are shipped by the seller, such origin and destination ports may encompass any other end points in a desired shipping route, which may not encompass shipping ports. For example, products offered for sale may be shipped from any desired origin, such as a U.S. or foreign location, to any desired destination, such as a U.S. location, with the origin and destination embodied as a postal shipping center, freight carrier depot and the like. In some embodiments, the products may encounter one or more intervening stops as they are shipped between their origin and their destination. Furthermore, it should be appreciated that the shipping of the products may be performed by land, water, air, or any combination thereof.

Figure 1:
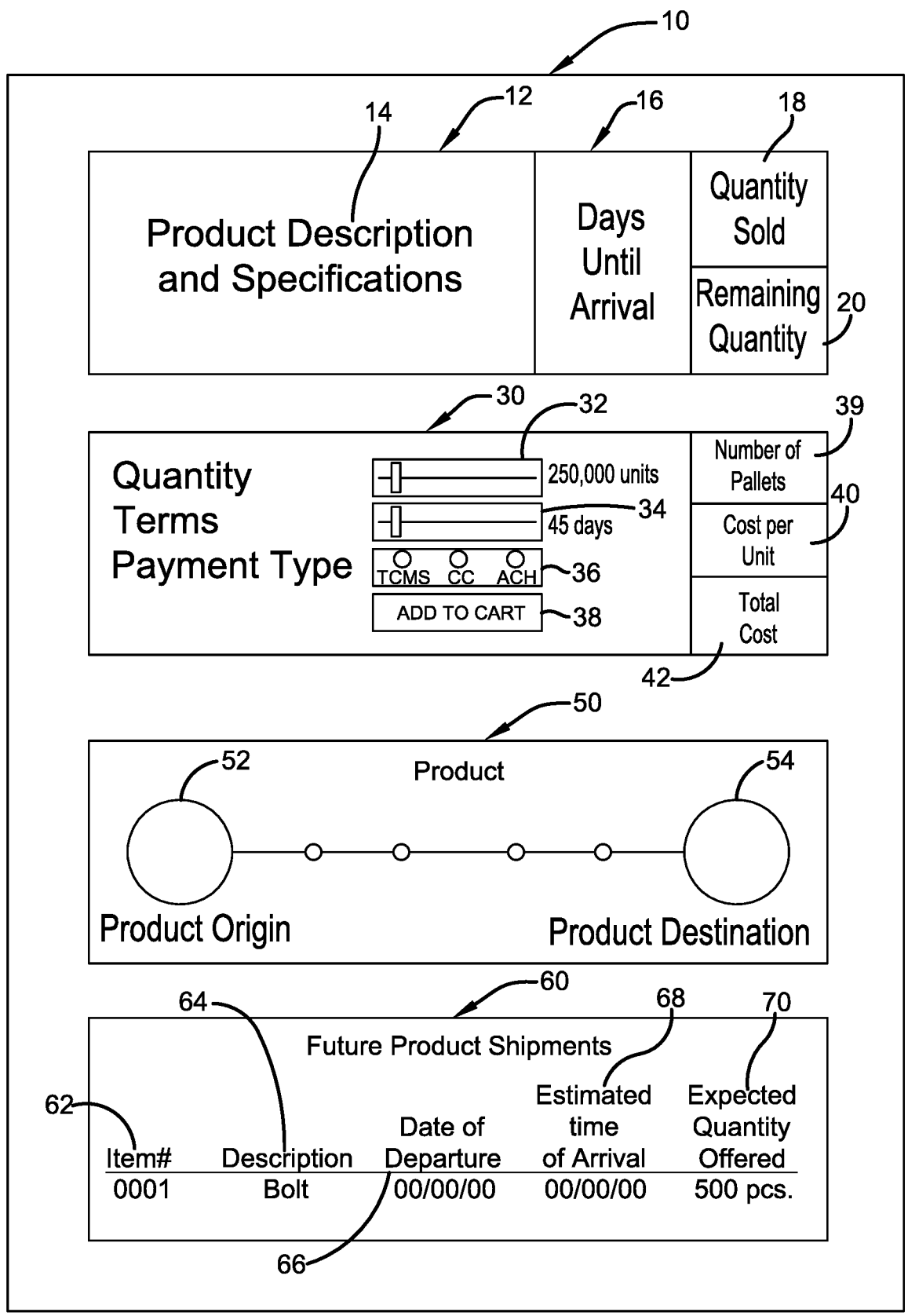
FIG. 1 is a diagrammatical representation of an online portal for a buyer to interact with a product ordering system to initiate the purchase of a product in accordance with the concepts of the various embodiments disclosed herein.

A. Online Portal:

The products being offered for sale by the seller while they are actually being shipped are presented to potential buyers through an online portal 10, as shown in FIG. 1. The online portal 10 comprises a user interface, such as a graphical user interface (GUI), that is displayed by a website or a software computer application that may be presented by a desktop/standalone computer or through a portable computing device, such as a smartphone. In addition, the buyer may interact with the online portal 10 using any suitable input device, such as a touchscreen, a computer mouse, trackpad, keyboard, and the like. The data presented by the online portal 10 is delivered from any suitable computing system, including one that utilizes a data connection and/or data communication network, such as a LAN (local area network), or a WAN (wide area network), such as the Internet or cellular communication network for example, or any combination thereof. Further, the computing system used by the online portal 10 may be a cloud computing system or other local or remote computing system, or any combination thereof. In one embodiment, the online portal 10 includes a product information field 12 having a product description and specifications section 14 that describes one or more of the particular features and particular specifications associated with the product being offered for sale, as well as, in some cases, a visual depiction of the product. The product information field 12 also includes a time until arrival section 16 that identifies the remaining amount of time before the product is scheduled to arrive at its destination. In addition, the product information field includes a product quantity sold section 18 and a product quantity remaining section 20, which respectively identifies the amount of the product that has already been sold and the amount of the product that remains for sale.

The online portal 10 also includes an order customization field 30 that includes a product quantity setting option 32, a product terms-of-purchase option 34, a payment type option 36, and an "ADD TO CART" option 38. The product quantity setting option 32 allows the buyer to set the quantity of product that they wish to order. The product terms-of-purchase option 34 allows the buyer to select the length of time in which the buyer is to complete payment for the purchased items. For example, the buyer may select a payment term duration from 0 to 45 days; however any desired length of time can be specified. The payment type option 36 allows the buyer to select the type of payment mode that will be used to complete payment, which may include: payment terms based on that selected by the terms-of-purchase option 34; credit card payment; and ACH (automated clearinghouse) payment. In addition, the ADD TO CART option 38, when selected, allows the buyer to place the product with the selected purchase options into their shopping cart, whereupon the payment particulars, including payment funding account numbers, and the like are input and processed to complete the purchase of the products. In addition, the order customization field 30 includes a number of pallets section 39 that displays the number of pallets that encompass the product unit quantity that was selected at the product quantity setting option 32. It should be appreciated that the number of pallets section 39 may be replaced with any bulk quantity, product group designation or identifier. For example, instead of "pallets", section 39 may indicate the number of "cases" that encompass the quantity of the selected product. Furthermore, the order customization field 30 includes a cost-per-unit section 40 that displays the specific cost per unit of the product based on one or more of the following criteria: (1) the quantity of products ordered; (2) the terms of purchase selected; (3) the payment type selected; (4) the remaining quantity of the product; and/or (5) the time until the arrival of the shipment to its destination. In addition, the order customization field 30 includes a total cost field 42 that displays the total cost of the buyer's order.

The online portal 10 also includes a shipment field 50, which provides the buyer with the current shipping status, including the amount of time remaining (or amount of time incurred) in the shipping of the products from their shipping origin 52 to their shipping destination 54, as well as any intervening stops. The shipment field may also include a graphical depiction of this shipping status, as shown in FIG. 1.

Continuing, the online portal 10 includes a future product shipments field 60, which includes one or more product records, which include one or more of the following data fields, including a future product item number 62, a future product description 64, a date of departure 66, an estimated time of arrival 68 and an expected quantity 70. The future product shipments include products to be made available in field 12 in the future.

It should be appreciated that in some embodiments, the online portal 10 may be configured to include product information field 12 and the order customization field 30, as well as any subset of the information included therein.

B. Products in Transit:

The products offered via the online portal 10 may include any desired product, and accordingly may encompass products, such as fasteners, including, but not limited to nuts, bolts, rivets, and the like. It should also be appreciated that these products may encompass products destined for the wholesale market or destined for the retail market. Moreover, these products may encompass specialized, general purpose or commodity products. Furthermore, in all cases, products offered for sale by the seller through the online portal 10 have been previously purchased by the seller or on behalf of another entity, and have been released, such as by a freight forwarder, into the custody of a shipping entity. Thus, at the time the shipping entity takes custody of the products at an origin, such products are considered to be shipped and "in transit" until they arrive at their final destination that has been specified by the seller of the products.

Figure 2:
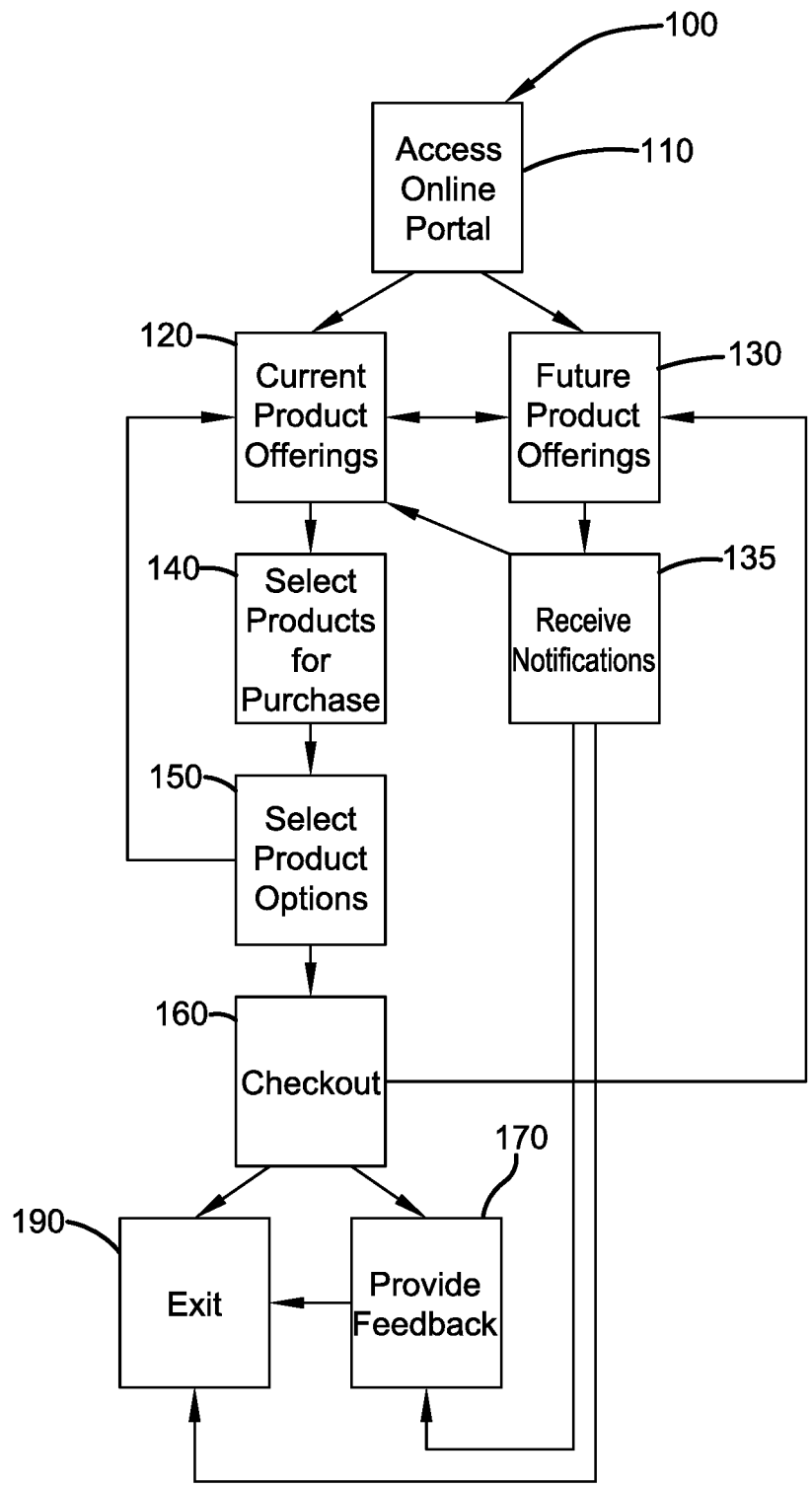
FIG. 2 is a flow diagram of the product ordering method in accordance with the concepts of the various embodiments disclosed herein.

C. Product Ordering Process:

Thus, the online portal 10 enables the buyer to order products, which, at the time of their ordering, are being shipped and are in en route to a final destination, as set forth in the operational steps of the ordering process 100 shown in FIG. 2. Initially, at step 110 of the process, a prospective buyer accesses the online portal 10. Once a prospective buyer has accessed the online portal 10, he or she may select the product offerings that are currently available and offered for sale by the seller and/or the product offerings that will be offered in the future, as indicated at steps 120 and 130. At step 120, the products that are currently available for sale are products the seller has purchased and is offering for sale or reselling to the buyer that is accessing the online portal 10. It should be appreciated that the buyer may purchase all or a portion of the total amount of this product quantity the seller is offering for sale. At step 140, the online portal 10 displays the product information field 12 and the order customization field 30, or some portion thereof for a product selected by the buyer via the online portal 10. These fields include one or more of: the time until delivery of the product 16, the quantity of the product that has already been sold 18, the quantity of the product remaining to be sold 20; and the product per-unit cost 40. Next, the buyer continues to step 150, where the particular product quantity he or she desires to purchase is set via the quantity field 32, the particular purchase terms are set via the terms field 34, and the particular payment type is set via the payment field 36. In some embodiments, these fields 32, 34 and 36 are set by the user via a slider bar that dynamically changes the value or settings of these fields 32, 34 and 36. It should be appreciated that in some embodiments, only the quantity field 32 is required to be set, while the remaining terms and payment may be predetermined or set by the seller. In some embodiments, one or more of: (1) the quantity of products ordered 32; (2) the terms of purchase 34; (3) the payment type 36; (4) the remaining product quantity field 20; and/or (5) the remaining transit time until arrival of the products 16 are used in the computation of the cost-per-unit of the product 40 and total cost field 42 presented on the online portal 10.

At the completion of step 150, the total cost of the quantity of the products ordered by the buyer is shown in the total cost field 42, whereupon the user is permitted to select the ADD TO CART option 38.

Next, once the products have been added to the cart at step 150, the order for the products added to the cart is then completed at step 160.

Following step 160, the buyer may optionally return to step 130 to determine what products may be available for sale in the future by the seller, to provide written feedback to the seller at 170 and/or exit the process 100 at step 190. For example, the feedback may include, but is not limited to, feedback on the various product offerings, operation of the system, etc.

Alternatively, if the user has elected to view products that will be available for sale in the future at 130 after accessing the online portal at step 110, or after completing a purchase of a product at step 160, the user can elect to receive a notification, as indicated at step 135, such as an email, text message or automated telephone call, when the future product becomes available as a current product offering and is in transit and available for sale. Accordingly, once the future product becomes available as a current product that is ready for purchase, the buyer proceeds to access the online portal 10 following the process steps 100 that begin at step 120. In some embodiments, the notification that is generated at step 1350 may include a link, such as a HTML hyperlink that directs the buyer to that specific product at step 120, thereby allowing the user to proceed and complete the ordering process via steps 140-160 as previously discussed.

Alternatively, if the user at step 160 elects not to proceed to step 130 and review future products, he or she can proceed to step 170 to provide feedback or may alternatively exit the process 100 at step 190.

Figure 3:
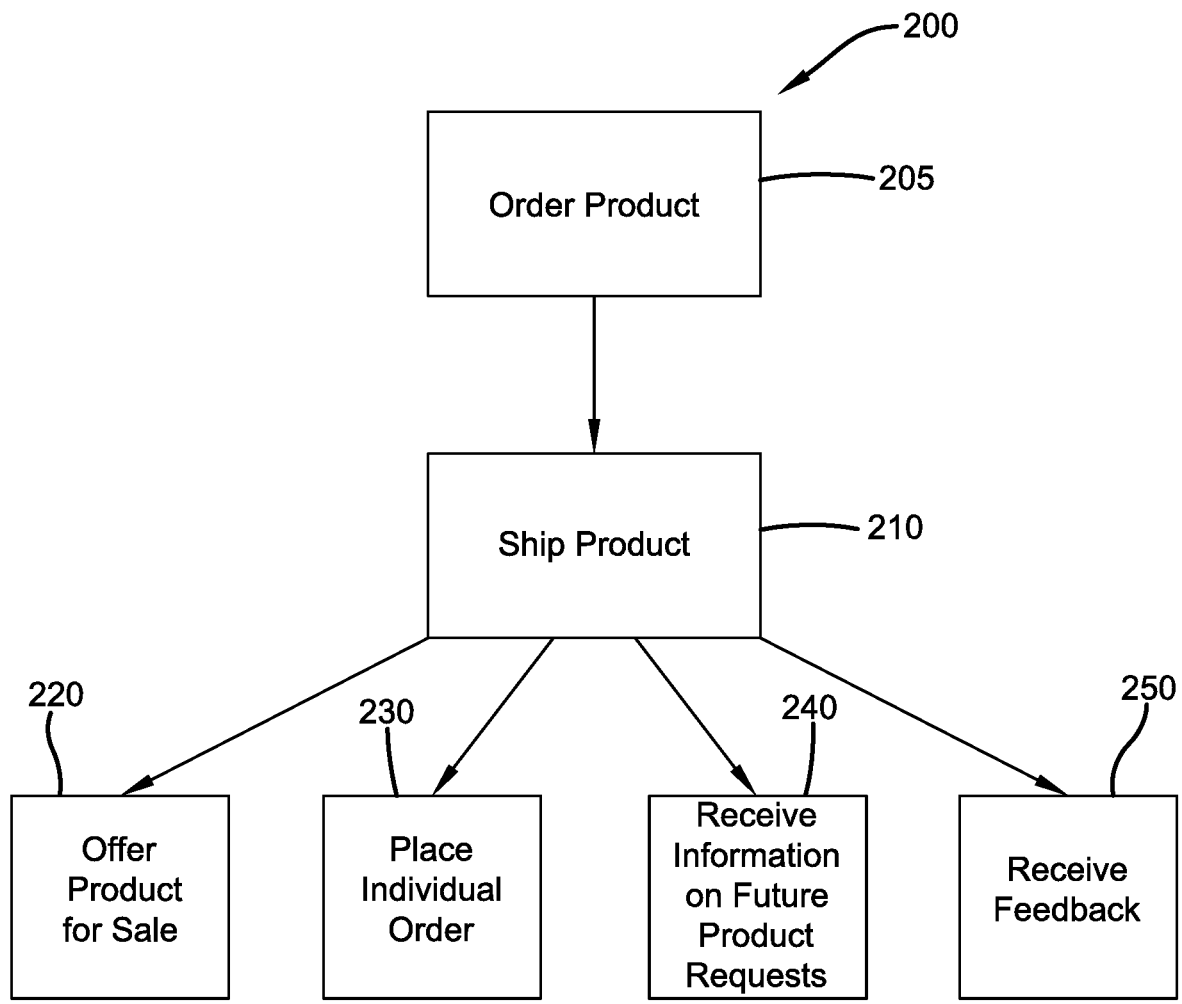
FIG. 3 is a flow diagram of an alternative product ordering method in accordance with the concepts of the various embodiments disclosed herein.

FIG. 3 is an alternative process 200 for executing the product ordering method. Specifically, the process 200 is configured, whereby the seller of a product places an order for the product to be resold at step 205. Next, at step 210 the product is shipped. While the product is in transit or shipped from its origin, such as "on the water", the seller may perform one or more of the following activities (a) offer the product for sale at step 220 via the online portal 10; (b) take orders for the product at 230; (c) receive information from buyers on future product needs at 240; and/or (d) receive feedback for buyers on the system at 250. For products that are offered for sale at step 220 and/or the orders that are received at step 230, the online portal 10 displays to the buyer at least the following information: (1) the products currently available for sale and that are in transit; (2) the remaining quantity of the product available for sale and in transit; (3) the remaining time that the products will be in transit; and (4) the current price of the product. Further, the pricing of the products may be based on one or more of the following criteria: (1) the quantity of products ordered; (2) the terms of purchase selected; (3) the payment type selected; (4) the remaining quantity of the product; and/or (5) the time until the arrival of the shipment to its destination. Also, the feedback from the buyer received at 250 may include, but is not limited to, feedback on the various product offerings, operation of the system, and the like.

In summary, the system and method discussed herein is directed to an ordering system and method that enables users to quickly and easily order and/or purchase products, including commodities, that are already "on the water" or otherwise in transit from their origin via a shipper. Furthermore, in some embodiments the system and method may be configured to calculate a product's price based on one or more of the following criteria: (1) the quantity of products ordered; (2) the terms of purchase selected; (3) the payment type selected; (4) the remaining quantity of the product; and/or (5) the time until the arrival of the product to its destination. It is contemplated that the improved system of ordering and delivering products originating from foreign countries, such as Taiwan, Korea, China, India and Vietnam, and arriving in the U.S. can be substantially reduced, while a savings to buyers can be realized, due, in part, to the reduction of middlemen in the supply chain.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A method of ordering a product through an online portal operated by a computer comprising:
   shipping a quantity of a product to a destination;
   offering for sale on the online portal, by a seller, said quantity of said product after said quantity of said product has been shipped;
   selecting, with an input device, through the online portal, by a buyer, at least a portion of said quantity of said product as a selected quantity, terms of purchase, and a payment type, wherein said selecting step is completed by moving a plurality of slider bars presented by the online portal to dynamically change the respective values of said selected quantity, said terms of purchase and said payment type that are selected by the buyer;
   displaying at the online portal a calculated price of said selected quantity of said product that is based on a current quantity of said product that is available for sale, a remaining shipping time for said product to arrive at said destination, said selected quantity, said terms of purchase selected by the buyer, and said payment type selected by the buyer; and
   completing an order through the online portal, by the buyer, for the selected quantity of said product at said calculated price.

2. The method of claim 1, wherein the online portal displays one or more of said selected quantity, said terms of purchase, and said payment type.

3. The method of claim 2, wherein the online portal further displays said remaining shipping time.

4. The method of claim 3, wherein the online portal further displays said current quantity of said product.

5. A method of selling a product through an online portal by a computer comprising:
 shipping a quantity of a product to a destination; and while said quantity of said product is being shipped:
 offering for sale on the online portal, by a seller, said quantity of said product;
 selecting, with an input device, through the online portal, by a buyer, at least a portion of said quantity of said product as a selected quantity, terms of purchase and a payment type, wherein said selecting step is completed by moving a plurality of slider bars presented by the online portal to dynamically change the respective values of said selected quantity, said terms of purchase and said payment type that are selected by the buyer;
 displaying at the online portal a calculated price of said selected quantity of said product that is based on a current quantity of said product that is available for sale, a remaining shipping time for said product to arrive at said destination, said selected quantity, said terms of purchase selected by the buyer, and said payment type selected by the buyer; and
 completing an order through the online portal, by the buyer, for the selected quantity of said product at said calculated price.

6. The method of claim 5, wherein the online portal displays one or more of said selected quantity, said terms of purchase, and said payment type.

7. The method of claim 6, wherein the online portal further displays said remaining shipping time for said product to reach its destination.

8. The method of claim 7, wherein the online portal further displays said current quantity of said product.

* * * * *